United States Patent [19]

Cobb

[11] 4,056,017

[45] Nov. 1, 1977

[54] OXYGEN BOTTLE CARRIER AND LINKAGE

[75] Inventor: Clyde A. Cobb, Feasterville, Pa.

[73] Assignee: Ziamatic Corporation, Yardley, Pa.

[21] Appl. No.: 668,934

[22] Filed: Mar. 22, 1976

[51] Int. Cl.2 .................... A62C 27/00; A47G 29/00; B66C 23/00; F16M 11/12

[52] U.S. Cl. ........................................ 74/522; 169/24; 169/67; 211/85; 224/29 R; 214/149; 248/183; 248/139

[58] Field of Search ...................... 74/522; 248/4, 124, 248/133, 138, 139, 371, 372, 376, 384, 393, 397, 429, 183, 278, 287, 309 R; 214/130, 133, 149; 211/80, 85; 224/29 K, 29 R, 29 L, 42.38; 169/24, 30, 51, 62, 67

[56] References Cited

U.S. PATENT DOCUMENTS

| | | | |
|---|---|---|---|
| 625,032 | 5/1899 | Homan | 248/278 X |
| 715,287 | 12/1902 | Paine | 248/139 |
| 1,006,693 | 10/1911 | Shaw | 248/185 |
| 1,061,102 | 5/1913 | Morton et al. | 248/185 |
| 1,345,042 | 6/1920 | Von Recklinghausen | 248/139 |
| 1,347,611 | 7/1920 | Blenko | 248/139 |
| 1,348,569 | 8/1920 | Knights | 248/371 |
| 1,474,212 | 11/1923 | Statham | 248/139 X |
| 2,261,426 | 11/1941 | Willcox | 248/183 |
| 2,606,332 | 8/1952 | Wade | 248/293 X |
| 2,649,791 | 8/1953 | Braymer | 248/183 X |
| 3,168,272 | 2/1965 | Swinyar | 248/139 |
| 3,628,759 | 12/1971 | Knedlik et al. | 248/291 X |

*Primary Examiner*—Samuel Scott
*Assistant Examiner*—Don E. Ferrell
*Attorney, Agent, or Firm*—Albert Sperry; Frederick A. Zoda; John J. Kane

[57] ABSTRACT

A mechanical linkage for moving an oxygen bottle disposed in a horizontal position at a first location on a fire engine to a vertical position at a second location. The linkage permits pivoting the oxygen bottle horizontally from the first location to the second and then pivoting the oxygen bottle vertically from the horizontal position to the vertical position.

5 Claims, 5 Drawing Figures

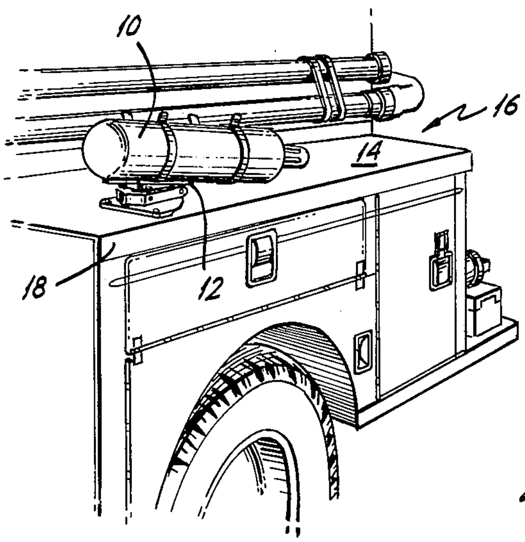
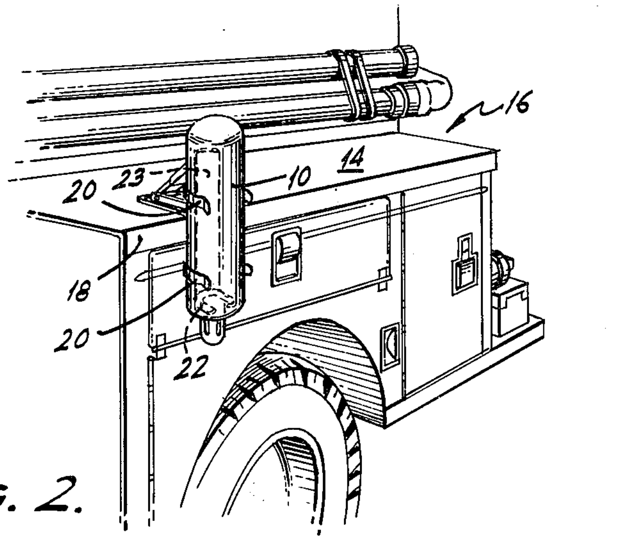
FIG. 2.
FIG. 1.
FIG. 4.
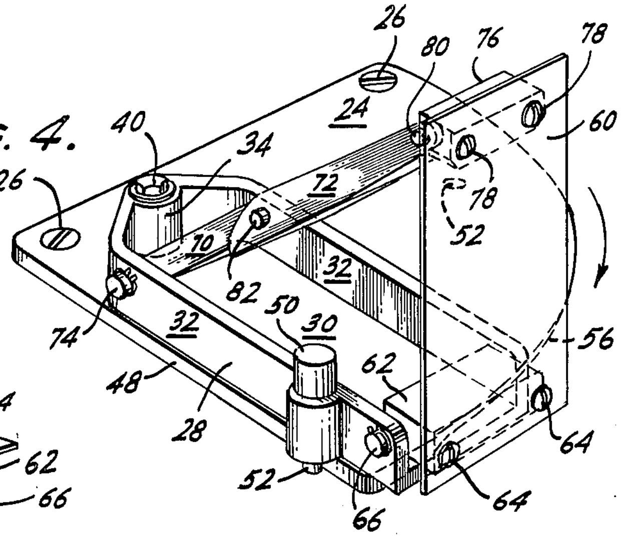
FIG. 3.
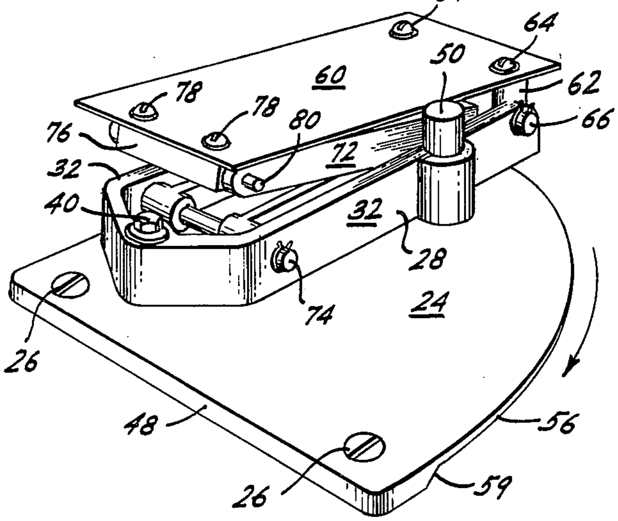
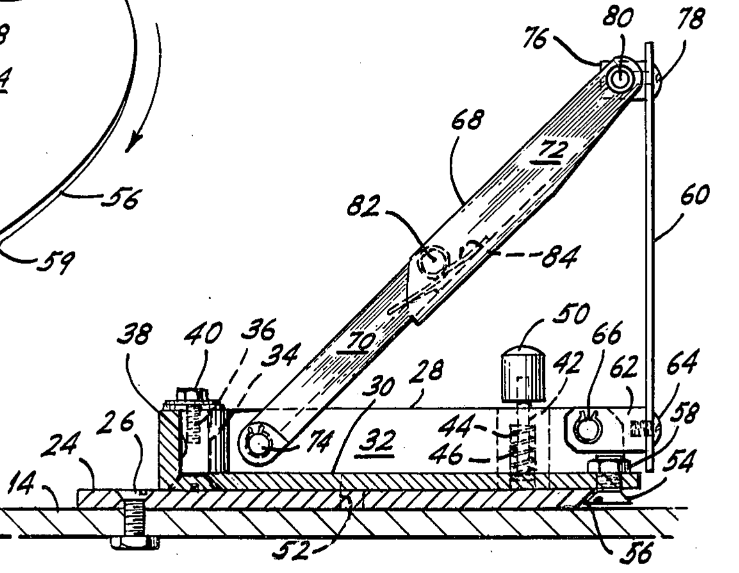
FIG. 5.

OXYGEN BOTTLE CARRIER AND LINKAGE

The present invention is that of a mechanical linkage and, in particular, to apparatus for moving an article mounted in a relatively inaccessible storage position to another position in which the article is accessible. While the invention will be described in connection with the storage and use of compressed air or oxygen bottles employed by firemen, it will be apparent that the invention has broader application.

There are many instances in everyday life where an article is stored in a relatively inaccessible location and must be moved quickly and effectively to a more accessible location for use. Oftentimes the physical surroundings and other factors do not permit permanently positioning the article in the more accessible use location.

For example, oxygen bottles, used by firemen while they are fighting fires or by others as in rescue or other emergency service, generally are stored in cabinets on fire engines either loosely or on some form of mechanical linkage. Usually, the oxygen bottles are stored in an inconvenient, e.g., horizontal orientation or at a height below the waist of the average fireman. When the oxygen bottle is needed, the loosely carried bottle is lifted out by one fireman and strapped to the back of the user. When the oxygen bottle is carried on a mechanical linkage, the user alone may remove the bottle and it is held in place at the proper height while the user straps it to his back.

Obviously, the arrangement in which the oxygen bottle is carried loosely is undesirable in that the user requires assistance and usually this procedure requires extra time. Mounting the oxygen bottle on a mechanical linkage which permits the user to move the bottle to the proper position and secure it to his back by himself clearly is preferable. However, it has been found that the linkages presently being used to perform this function are somewhat complicated, thereby adversely affecting their reliability, effectiveness and cost.

Accordingly, it is an object of the present invention to provide a new and improved mechanical linkage.

A feature of the present invention is its provision of a mechanical linkage which is relatively simple in construction, easy to operate, and inexpensive to fabricate.

Another feature of the present invention is its provision of a mechanical linkage particularly suited to meet the requirements of speed and reliability when used to mount compressed air or oxygen bottles on fire engines.

A mechanical linkage, constructed in accordance with the present invention, comprises a planar platform, a base member and a support member. The base member is pivotally mounted on the platform on an axis perpendicular to the plane of the platform. The support member is pivotally mounted on the base member on an axis parallel to the plane of the platform. Means are provided for limiting the pivotal movement of the support member between a position substantially parallel to the plane of the platform and a position substantially perpendicular to the plane of the platform.

For a better understanding of the present invention, together with other and further features thereof, reference is made to the following description, taken in conjunction with the accompanying drawing, and the scope of the invention is set forth in the appended claims.

Referring to the drawing:

FIG. 1 is a perspective view of a portion of a fire engine having a compressed air or oxygen bottle mounted on a shelf and in a storage position;

FIG. 2 is a perspective view, similar to FIG. 1, with the oxygen bottle in a use position;

FIG. 3 is a perspective view of a preferred embodiment of the mechanical linkage of the present invention in one position;

FIG. 4 is a perspective view of the mechanical linkage of FIG. 3 in a second position; and FIG. 5 is a side view of the mechanical linkage in the FIG. 4 position.

In FIG. 1, an oxygen bottle 10 is carried in a clamping device 12. Bottle 10 and clamping device 12 are mounted on a shelf 14 of a fire engine 16 by means of a mechanical linkage constructed in accordance with the present invention and to be described in greater detail hereinafter. The oxygen bottle is shown in the storage position. In particular, bottle 10 is in a generally horizontal position with no portion of the bottle or the mounting mechanical linkage extending beyond a side edge 18 of shelf 14. The bottle is held securely on the vehicle and within its dimensions with no overhang.

In FIG. 2, oxygen bottle 10 is shown in the use position. The bottle has been turned 90° horizontally, so that a portion of the linkage carrying the bottle hangs over side edge 18 of shelf 14. This permits the bottle to be swung 90° vertically just off the edge of shelf 14. In this position, oxygen bottle 10 is ready to be secured to the back of a fireman. The bottle is held in place by two pairs of flexible clamp fingers 20 which are part of clamping device 12 and spaced from its clamp support base 22 along a clamp brace 23. Oxygen bottle 10 is supported on clamp support base 22 and is resiliently engaged by clamp fingers 20.

FIGS. 3, 4 and 5 show the details of the mechanical linkage of the present invention used to mount oxygen bottle 10 and clamping device 12 on shelf 14. FIG. 3 shows the linkage in position to hold the oxygen bottle in the storage position of FIG. 1, while FIGS. 4 and 5 show the linkage in position to hold the oxygen bottle in the use position of FIG. 2.

The mechanical linkage includes a planar platform 24 beneficially in the form of a quarter circle plate. Platform 24 is adapted to be secured to shelf 14 by a plurality of screws 26.

The mechanical linkage also includes a base member 28, for example in the form of a casting, having a planar bottom 30 and side walls 32. Base member 28 is pivotally mounted on platform 24. A standoff 34 is secured to platform 24 and extends upwardly from the platform perpendicular to the platform. One end of the standoff is provided with a threaded blind hole 36. Base member 28 has a hole 38, dimensioned to fit the base member onto standoff 34. Base member 28 is permitted to move pivotally about standoff 34 and slide along the upper surface of platform 24. A headed screw 40, in threaded engagement with hole 36, retains base member 28 on standoff 34.

Horizontal pivotal movement of base member 28 is limited by a spring loaded pin 42 carried in a side wall 32 of the base member. The lower end of pin 42 extends to a point below the upper surface of platform 24. The action of a spring 44, contained in a counterbore 46, urges the pin downwardly. For the position shown in FIG. 3, the lower end of pin 42 extends through a hole in platform 24, thereby preventing base member 28 from pivotally moving in the horizontal direction of the arrows shown in FIGS. 3 and 4. The hole in platform 24 which receives the lower end of pin 42 to lock base member 28, relative to the platform, in the position shown in FIG. 3 is identified by reference numeral 52 in FIG. 4. When a knob 50, on the upper end of pin 42, is pulled upwardly against the action of spring 44 so that the lower end of the pin clears hole 52 in platform 24, the base member may be rotated horizontally in the direction of the arrows shown in FIGS. 3 and 4 to the position illustrated in FIG. 4. At this point, knob 50 is released and pin 42 drops along an edge 48 of platform 24 because of the action of spring 44 on pin 42. The abutting engagement of pin 42 against edge 48 prevents base member 28 from moving back in a direction opposite to the arrows shown in FIGS. 4 and 5.

The rotary movement of base member 28 is guided by a flat head screw 54 moving along a camming surface 56 extending around the curved surface of platform 24. Screw 54, located at the end of base member 28 opposite from pivot screw 40, is secured to the base member by a nut 58. This arrangement assures sliding movement of base member 28 along the upper surface of platform 24 and maintains the contact between the base member and the platform. Rotary movement of base member 24 beyond the position shown in FIGS. 4 and 5 is prevented by the abutment of screw 54 against the end of camming surface 56 identified by reference numeral 59 in FIG. 3.

The mechanical linkage of the invention further includes a support member 60 in the form of a rectangular plate. Support member 60 is pivotally mounted on base member 28 on an axis parallel to the plane of platform 24. In particular, a block 62, secured to support member 60 by screws 64, is pivotally mounted between opposite side walls 32 of base member 28 by means of a pivot pin 66 which extends through aligned holes in the opposite side walls and block 62. With support member 60 mounted on base member 28, the support member moves, relative to platform 24, with the base member.

Support member 60 undergoes pivotal movement between a position substantially parallel to the plane of platform 24 as shown in FIG. 3 and a position substantially perpendicular to the plane of platform 24 as shown in FIGS. 4 and 5. The extent of this movement is limited by a folding linkage 68 extending between one end of base member 28 and one end of support member 60. Linkage 68 includes a pair of links 70 and 72. Link 70 is pivotally mounted between opposite side walls 32 of base member 28 by means of a pin 74 extending through aligned holes in the opposite side walls and this link. Link 72 is pivotally mounted on a block 76, secured to support member 60 by screws 78, by means of a pin 80 extending through aligned holes in block 76 and this link. Links 70 and 72 are pivotally connected by means of a pin 82 extending through aligned holes in the links. A spring 84 urges links 70 and 72 to assume the position shown in FIGS. 4 and 5, whereby support member 60 is positioned vertically.

In the absence of an appropriate weight on support member 60 necessary to overcome the force of spring 84, the support member tends to assume a vertical position regardless of the position of base member 28 relative to platform 24. When weighed down, as with an oxygen bottle, support member 60 and the article carried on the support member remain in a substantially horizontal position. The tendency for the folding linkage to spring, whereby the support member would move to the vertical position, is overcome by the weight and dimensions of the article carried on the support member.

It should be noted that in certain applications, a support member, in the form of rectangular plate 60, may be dispensed with. For example, clamp brace 23 of clamping device 12 may be secured directly to blocks 62 and 76 by screws 64 and 78. Even in such an application it may be desirable to provide a plate 60 to serve as a shipping brace and to have the plate available to serve as a template for locating the holes in the clamping brace for securing the clamping device to blocks 62 and 76. It will be understood that the support member may take forms other than plate 60 or other components serving different functions also may serve as the support member. In other applications, the article to be mounted may be secured directly to blocks 62 and 76 without any intermediate mounting component. In such instances, the article being mounted may be considered the support member.

When it is desired to move the oxygen bottle into the use position, knob 50 of pin 42 is raised so that the lower end of the pin clears hole 52 in platform 24. At the same time, the oxygen bottle is grasped and rotated, whereby base member 28 pivots about stand off 34 until pin 42 passes edge 48 of platform 24. After the oxygen bottle has been turned to this position, the end of the bottle which hangs over the edge of shelf 14 will rotate downwardly with oxygen bottle pivoting about pin 66 until the oxygen bottle assumes the vertical position. Because of the action of spring 84, folding linkage 68 in its then extended position, forms a rigid connection maintaining the oxygen bottle in the vertical. This assures that the oxygen bottle will be held in place in the vertical position while the fireman secures the oxygen bottle to his back.

Support member 60 may be returned to the horizontal position by pushing downwardly on the folding linkage at pivot 82 and simultaneously pushing at the top end of the support member. This may be done with base member 28 either in the position shown in FIG. 3 or the position shown in FIGS. 4 and 5. Alternatively, with a component, such as clamping device 12, mounted on the linkage, the linkage may be collapsed and then returned to the storage position by pulling upwardly at the bottom of the clamping device, while pushing downwardly on the folding linkage at pivot 82 and then rotating the linkage from the position in FIG. 4 to the position in FIG. 3.

While there has been described what is at present considered to be a preferred embodiment of this invention, it will be obvious to those skilled in the art that various changes and modifications may be made therein without departing from the invention and it is, therefore, aimed to cover such changes and modifications as fall within the true spirit and scope of the invention.

What is claimed is:

1. Apparatus for mounting an oxygen bottle on a shelf on a fire engine comprising:

a planar platform adapted to be secured to said shelf;

a base member;

means for pivotally mounting said base member on said platform on an axis perpendicular to the plane of said platform for movement from a position extending parallel to said shelf to a position in which an end of the platform projects beyond an edge of the shelf;

clamping means on said base member for holding an oxygen bottle, said clamping means including a clamp support base adapted to support said oxygen bottle and flexible clamp fingers spaced from said clamp support base adapted to resiliently engage and receive said oxygen bottle;

means for pivotally mounting said clamping means on said base member on an axis parallel to the plane of said platform;

and means for limiting pivotal movement of said clamping means between a position substantially parallel to the plane of said platform and a position substantially perpendicular to the plane of said platform.

2. Apparatus according to claim 1 and further including means for limiting pivotal movement of said base member between two radially spaced positions.

3. Apparatus according to claim 1 wherein said means for limiting pivotal movement of said clamping means form a rigid connection when said clamping means are in said position substantially perpendicular to the plane of said platform.

4. A device for supporting an oxygen bottle or the like on a shelf of a fire engine or other mounting means comprising a platform adapted to be fixedly secured in a horizontal position on such a shelf, a base member having one end thereof pivotally connected to said platform for movement over said platform in a plane parallel thereto from a first position in which the base member and an oxygen bottle thereon extend parallel to said shelf to a second position in which the opposite end of the base member projects beyond an edge of said shelf, a support member pivotally mounted adjacent said opposite end of said base member for movement at right angles to said platform into and out of a vertical position adjacent said shelf when said platform is moved to said second position, and folding linkage members connected to said base member and support member for holding said support member and an oxygen bottle secured thereto in said vertical position.

5. A device as defined in claim 4 wherein spring means connected to said folding linkage normally urges said support member toward a position perpendicular to said platform.

* * * * *